(12) United States Patent
Sharma

(10) Patent No.: US 7,161,909 B2
(45) Date of Patent: Jan. 9, 2007

(54) METHOD AND SYSTEM FOR ACKNOWLEDGING THE RECEIPT OF A TRANSMITTED DATA STREAM IN A WIRELESS COMMUNICATION SYSTEM

(75) Inventor: Sanjeev K. Sharma, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/830,990

(22) Filed: Apr. 23, 2004

(65) Prior Publication Data

US 2005/0238054 A1    Oct. 27, 2005

(51) Int. Cl.
*H04L 12/56* (2006.01)

(52) U.S. Cl. .............. 370/235; 370/394; 370/473

(58) Field of Classification Search ............. 370/235, 370/236, 338, 352, 394, 473; 455/510, 517
See application file for complete search history.

(56) References Cited

U.S. PATENT DOCUMENTS

| | | | |
|---|---|---|---|
| 5,555,266 A * | 9/1996 | Buchholz et al. | 370/347 |
| 6,721,302 B1 * | 4/2004 | Alastalo | 370/346 |
| 2004/0142710 A1 * | 7/2004 | Liang | 455/466 |
| 2004/0233878 A1 * | 11/2004 | Liu et al. | 370/338 |
| 2004/0240426 A1 * | 12/2004 | Wu et al. | 370/350 |

OTHER PUBLICATIONS

U.S. Appl. No. 60/440,575.*

* cited by examiner

*Primary Examiner*—Ricky Q. Ngo
*Assistant Examiner*—Richard Chang
(74) *Attorney, Agent, or Firm*—Knobbe Martens Olson & Bear LLP.

(57) ABSTRACT

A method and system for acknowledging the receipt of a transmitted data stream in a wireless local area network (WLAN) are disclosed. One aspect of the invention provides a system and method of acknowledging the receipt of a transmitted data stream in a wireless local area network, wherein the system sends a single acknowledgement to the transmitting party after all of the fragment packets, which belong to a sequence, are received in the receiving party. Another aspect of the invention provides a system and method of confirming the receipt of a transmitted data stream in a wireless local area network, wherein the system transmits a plurality of fragment packets without waiting for an acknowledgement for each fragment packet from the receiving party.

18 Claims, 6 Drawing Sheets

METHOD AND SYSTEM FOR ACKNOWLEDGING THE RECEIPT OF A TRANSMITTED DATA STREAM IN A WIRELESS COMMUNICATION SYSTEM

BACKGROUND OF THE INVENTION

1. Field of the Invention

This invention relates to a data communication system, and particularly to a method and system for acknowledging the receipt of a transmitted data stream in a wireless communication system.

2. Description of the Related Technology

Recently, a variety of computer network systems that make use of wireless communication systems have been widely used. Such network systems include a local area network (LAN), a wide area network (WAN), a wireless local area network (WLAN), a wireless personal area network (WPAN), a general packet radio service (GPRS) network and other wireless network systems. The network systems allow communication between various end terminals such as a personal computer (desktop, laptop, and palmtop), a mobile phone, or other portable communication devices. It is typical that such network systems include at least one bridge element or hub such as an access point (or access node) where user traffic enters and exits a communications network.

In most of the above networks, when an end terminal device transmits data, it encapsulates the data into a sequence of packets with the destination address being placed inside the header of each packet. The packet is then transmitted onto a network. All other connected devices read the address in the packet header, but a device will only read the data in a packet if it recognizes its own address. Once the packet has been read, the destination device acknowledges the receipt of a received packet by responding to the source (the source address is also placed in the packet header). The acknowledgment packet tells the source that the data was received successfully, or that it was corrupt and re-transmission is necessary.

SUMMARY OF CERTAIN INVENTIVE ASPECTS OF THE INVENTION

One aspect of the invention provides a method of acknowledging the receipt of a transmitted data stream in a wireless local area network (WLAN). The method comprises i) transmitting a plurality of packets from a transmitting entity to a receiving entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the fragment packets are transmitted in the order of the fragment numbers, ii) determining whether the last fragment packet of the sequence is received in the receiving entity and iii) sending an acknowledgement packet from the receiving entity to the transmitting entity only after it has been determined that the last fragment packet has been received by the receiving entity.

Another aspect of the invention provides a method of acknowledging the receipt of a transmitted data stream in a wireless local area network (WLAN). The method comprises i) receiving a plurality of packets from a transmitting entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the fragment packets are received in the order of the fragment numbers, ii) determining whether the last fragment packet of the sequence is received and iii) sending an acknowledgement packet to the transmitting entity only after it has been determined that the last fragment packet has been received.

Another aspect of the invention provides a method of confirming the receipt of a transmitted data stream in a wireless local area network (WLAN). The method comprises i) sequentially transmitting a plurality of packets to a receiving entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the plurality of fragment packets are transmitted without waiting for an acknowledgement, for each individual fragment packet, from the receiving entity and ii) receiving an acknowledgement frame from the receiving entity only after the last fragment is transmitted.

Another aspect of the invention provides a computer data signal embedded in a carrier wave, wherein the signal is configured to acknowledge the receipt of a plurality of MAC protocol data units (MPDUs), forming a MAC service data unit (MSDU), in a wireless local area network (WLAN), wherein the plurality of MPDUs are sequentially transmitted from a transmitting entity to a receiving entity, and wherein the signal is transmitted to the transmitting entity only after it has been determined that the last MPDU of the MSDU has been received by the receiving entity so as to acknowledge the receipt of the plurality of MPDUs belonging to the MSDU.

Another aspect of the invention provides a computer data signal embedded in a carrier wave, wherein the signal is configured to acknowledge the receipt of a plurality of MAC protocol data units (MPDUs), forming a MAC service data unit (MSDU), in a wireless local area network (WLAN), wherein the plurality of MPDUs are sequentially transmitted from a transmitting entity to a receiving entity, and wherein the signal does not include individual acknowledgment frames for each of the MPDUs.

Yet another aspect of the invention provides a computer data signal embedded in a carrier wave. The signal comprises i) a bitmap section including a plurality of bitmap fields, each of the plurality of bitmap fields defining a receiving status of each of a plurality of MAC protocol data units (MPDUs), wherein the plurality of MPDUs form a MAC service data unit (MSDU) and are sequentially transmitted to a receiving entity and ii) a control frame section including a subtype field, wherein a reserved value of the subtype field is configured to define a NACK frame indicative of no acknowledgement in case one or more of the MPDUs of the MSDU are not received by the receiving entity.

BRIEF DESCRIPTION OF THE DRAWINGS

The foregoing and other features of the invention will become more fully apparent from the following description and appended claims taken in conjunction with the following drawings, in which like reference numerals indicate identical or functionally similar elements.

DETAILED DESCRIPTION OF CERTAIN EMBODIMENTS OF THE INVENTION

Figure 1:
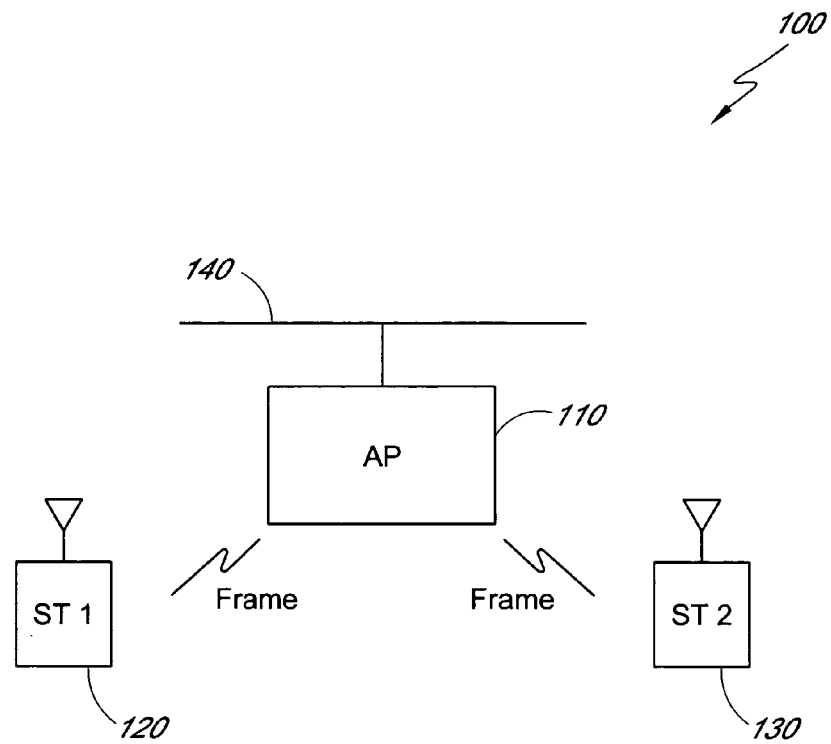
FIG. 1 illustrates a typical wireless network system including an access point.

FIG. 1 illustrates a typical wireless network system 100. The network system 100 comprises an access point (AP) 110, first and second stations (ST1, ST2) 120, 130 and a backbone network 140. In one embodiment, the network system 100 may be implemented with an IEEE 802.11a/11b/11g network, a wireless local area network (WLAN), a wireless personal area network (WPAN), a general packet radio service (GPRS) network, a global system for mobile communication (GSM) network, a code division multiple access (CDMA) network, a Bluetooth network or other suitable wireless networks.

In one embodiment, the system of FIG. 1 may form a single wireless cell, which is typically called a basic service set (BSS) such as used in the IEEE 802.11 standard. In this embodiment, two or more of the basic service sets form a plurality of wireless cells, typically referred to as an extended service set (ESS).

The access point 110, which may also be referred to as an access node or a wireless bridge, is in wireless data communication with the stations 120, 130. For example, when the station 120 transmits data to the station 130, the transmitted data is received in the access point 110 first, and thereafter, the access point 110 transmits the received data to the station 130. That is, the access point 110 functions as a bridge between the stations 120, 130 or as a base station. In one embodiment, the access point 110 is wirelessly or wiredly connected to the backbone network 140, which is typically called a distribution system (DS) such as used in the IEEE 802.11 standard. In one embodiment, the backbone network 140 comprises an Ethernet or other suitable wireless networks as discussed above.

In one embodiment, the access point 110 may be one of the following products: Airespace 1200, available from Airespace Inc., IronPoint, available from Foundry Networks, or Altitude 300 and Summit 300, available from Extreme Networks, for example.

Each of the stations 120 and 130 may also be referred to as an end terminal, a user device, a client terminal, a client device or a client. Each of the stations 120, 130 may be, for example, a personal computer (desktop, laptop and palmtop), a mobile phone, or other portable communication devices such as a hand-held PC, a wallet PC and a personal digital assistant (PDA).

A description of the general operation of a typical network system, including an access point, can be found, for example, by Brian P. Crow et. al "IEEE 802.11 Wireless Local Area Networks", IEEE Communications Magazine, September 1997, pp. 116–126, which is incorporated by reference herein.

Figure 2:
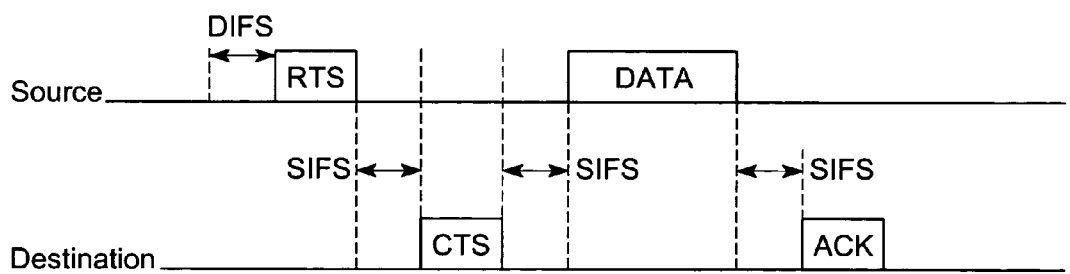
FIG. 2 illustrates typical frame sequences during the transmission between a source device and a destination device.

In one embodiment, such as in the IEEE 802.11 network, the access point 110 is in wireless data communication with the stations 120 and 130 as illustrated in FIG. 2. In this embodiment, after the period of distributed inter-frame spaces (DIFS), which are used to start new transmission, the source device (which will also be referred to as a transmitting party or a transmitting entity) transmits a short control packet called RTS (request to send) to the destination device (which will also be referred to as a receiving party or a receiving entity). In one embodiment, each of the source and destination devices may be an access point or a station (end terminal). After the period of short inter-frame spaces (SIFS), which are used to separate each data (packet) transmission, the destination device responds to the source device, if the access medium is free, with a response control packet called CTS (clear to send). In reply, the source device transmits data to the destination device. When the transmitted data packet is received, the destination device sends an acknowledgment or ACK, typically in the form of a control packet, to the source device. Thereafter, the next packet is transmitted by the source device.

Figure 3:
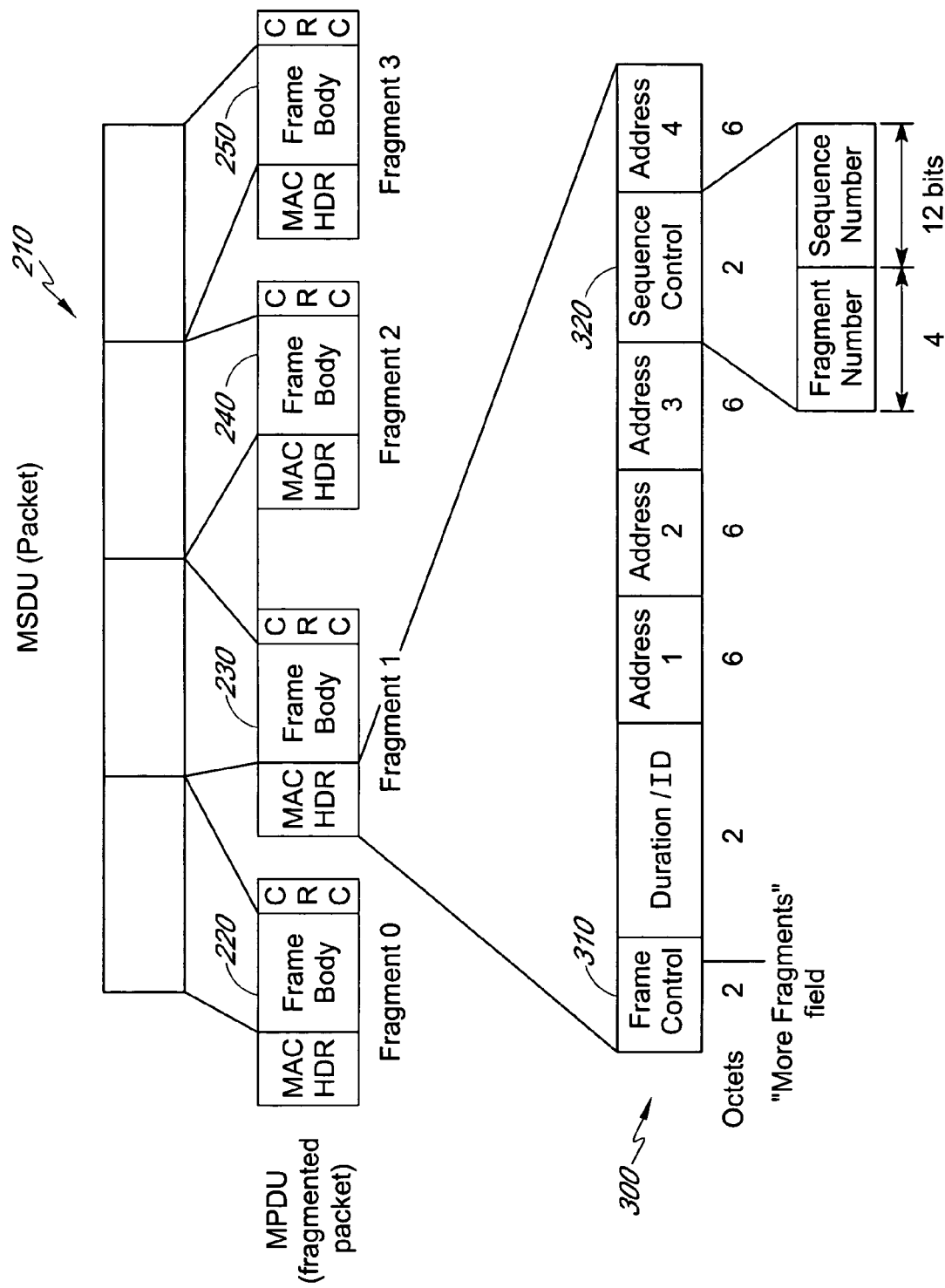
FIG. 3 illustrates data formats of an entire packet and fragmented packets.

FIG. 3 illustrates data formats of an entire packet and fragmented packets. In one embodiment such as in the IEEE 802.11 network, before transmission, a packet (generally referred to as a MAC service data unit (MSDU) 210 in the 802.11 standard) is fragmented into a plurality of smaller packets or fragments 220–250. Each fragment is generally referred to as a MAC protocol data unit (MPDU) in the standard. Throughout the specification, fragment packets and fragments will be used interchangeably.

Generally, each fragment (MPDU) 220–250 has the same data format as that of the entire data packet (MSDU) 210. The destination device will reassemble the received fragment packets. The process of this fragmentation and reassembly is called a link adaptation method since it is used to provide a more reliable link by transmitting fragmented packets (smaller in size). This method provides less chance of a packet being lost due to noise (higher loss probability of larger packets) and causes less bandwidth loss due to small size of packet. In addition, even if the fragments are lost, an even smaller amount of data is actually lost compared to the entire packet transmission.

Figure 4:
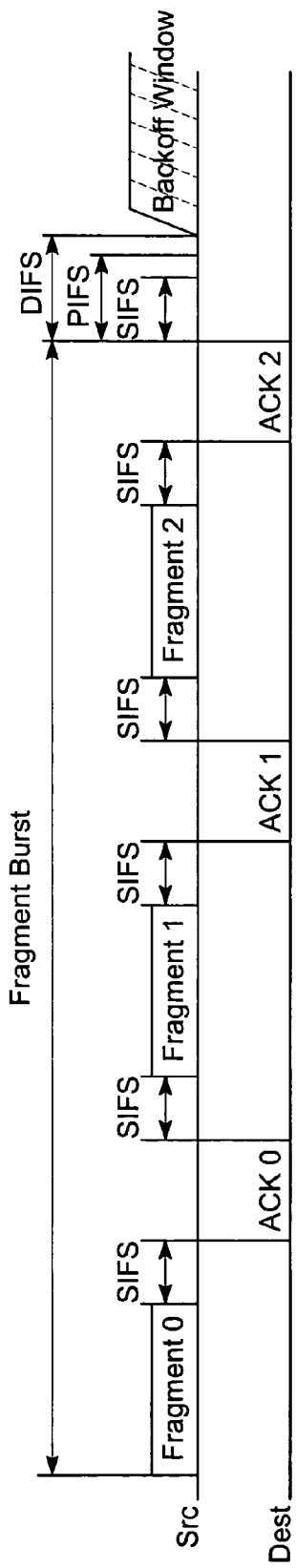
FIG. 4 illustrates a sequence of fragment and acknowledgment packets according to the current IEEE 802.11 standard.

FIG. 4 illustrates a sequence of fragment and acknowledgment packets according to the current IEEE 802.11 standard. Referring to FIG. 4, each fragment is generally treated as an independent packet during the transmission. After receiving each fragment, the destination device (Dest) sends an acknowledgment (ACK) to the source device (Src) to indicate the reception of each of the fragment packets. For example, after Fragment 0 is received, an ACK 0 is sent from the destination device to the source device. Similarly, after Fragments 1 and 2 are received, ACKs 1 and 2 are sent to the source device, respectively. If a transmitted fragment is not acknowledged after a certain period of time (for example, the SIFS period), the source device assumes that the transmitted fragment has not been received correctly and retransmits that fragment.

In FIG. 4, PIFS represents point coordination inter-frame spaces and are used by an access point to gain access to the medium before any other station. In addition, Backoff Window is used in a backoff algorithm which resolves contentions between communication parties (stations, access point) trying to access the same medium. According to the algorithm, each communication party chooses a random number (n) and waits for this number of slots before accessing the medium.

However, the acknowledgment method of FIG. 4 adds overhead to both of the source and destination devices. From the standpoint of the destination device, an acknowledgment needs to be sent each time a fragment is received. On the other hand, the source device needs to wait for the SIFS period to receive an acknowledgment for each fragment from the destination device. As the size of the total packets becomes large, the number of fragments increases. By using the fragmentation transmission mechanism according to the IEEE 802.11 standard (such as in FIG. 4), communication overhead can significantly increase. Thus, there has been a need to provide efficient acknowledgment in a wireless communication environment, such as the IEEE 802.11 based network.

One aspect of the invention provides a system and method of acknowledging the receipt of a transmitted data stream in a wireless local area network, wherein the system sends a single acknowledgment to the transmitting party after all of the fragment packets, which belong to a sequence, are received in the receiving party. Another aspect of the invention provides a system and method of confirming the receipt of a transmitted data stream in a wireless local area network, wherein the system transmits a plurality of fragment packets without waiting for an acknowledgment for each fragment packet from the receiving party.

Figure 5:
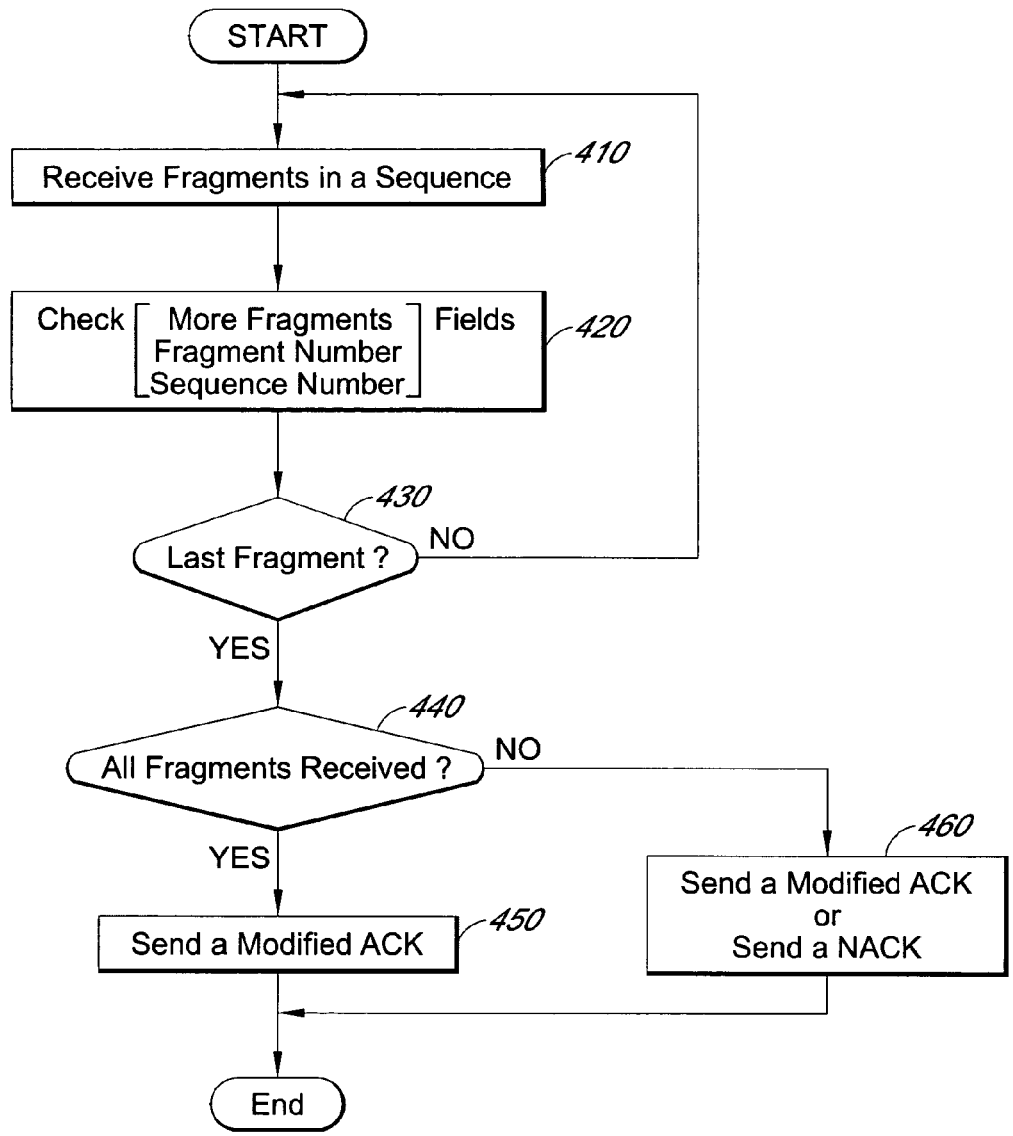
FIG. 5 illustrates an exemplary flowchart which shows an acknowledgment procedure according to one embodiment of the invention.

FIG. 5 illustrates an exemplary flowchart which shows an acknowledgment procedure according to one embodiment of the invention. In one embodiment, the acknowledgment procedure is implemented in a conventional programming language, such as C or C++ or another suitable programming language. In one embodiment of the invention, the program is stored on a computer accessible storage medium at an access point or a receiving station. In another embodiment, the program can be stored in other system locations so long as it can perform the acknowledgment procedure according to embodiments of the invention. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In one embodiment of the invention, data communication within the system 100 (FIG. 1) is carried out using IEEE 802.11 (802.11a/11b/11g) or other suitable wireless communication standards, either known today or developed in the future. The specification of IEEE 802.11a/11b/11g can be found, for example, at http://standards.ieee.org/getieee802/802.11.html. The specifications of IEEE 802.11a/11b/11g are incorporated herein by reference. The medium access control (MAC) protocol is an effective methodology that allows devices connected to a network system to share their interconnecting media.

In another embodiment, either the access point 110 or each station 120, 130 comprises a processor (not shown) configured to or programmed to perform the acknowledgment method according to embodiments of the invention such as a procedure illustrated in FIG. 5. The program may be stored in the processor or a memory of the access point 110 or each station 120, 130. In various embodiments, the processor may have a configuration based on Intel Corporation's family of microprocessors, such as the Pentium family and Microsoft Corporation's windows operating systems such as WINDOWS 95, WINDOWS 98, WINDOWS 2000 or WINDOWS NT. In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like.

Referring to FIGS. 3 and 5–9, the operation of the access point 110 or each station 120, 130, as either a transmitting entity or a receiving entity, will be described in more detail. In one embodiment as illustrated in FIGS. 3 and 6–9, data communication within the system 100 is carried out using IEEE 802.11 (802.11a/11b/11g). In one embodiment as shown in FIG. 5, the access point 110 or each station 120, 130 operates as a receiving party (entity). Referring to FIG. 5, the receiving entity (access point or station) receives fragments in a sequence from a transmitting entity (410).

In one embodiment as shown in FIG. 3, each fragment includes a MAC header 300. The MAC header, among other things, includes, a frame control section 310 and a sequence control section 320. The frame control section (e.g., 16 bits assigned according to the 802.11 standard) includes, among other things, information regarding frame type (control, management or data), frame subtype, transmission type (first transmission or retransmission) and a "more fragments" field. The "more fragments" field is used for a transmitting entity to inform a receiving entity whether more fragments will follow or not after a current fragment is transmitted. For example, if the field is set as "1", this means that more fragments will follow. In contrast, if the field is set as "0", this means that more fragments will not follow.

Referring to FIG. 3, the sequence control section 320 (16 bits assigned according to the 802.11 standard) includes a fragment number field (4 bits assigned according to the 802.11 standard) and a sequence number field (12 bits assigned according to the same standard). The fragment number field represents the number of a fragment which is being transmitted. The sequence number field represents the number of a sequence which includes a set of fragments being sequentially transmitted. In one embodiment, sequence numbers of the MPDUs remain the same but the fragment number of each MPDU is incremented by one. In one embodiment, one MSDU can include up to 16 fragments (MPDUs).

The receiving entity checks i) more fragments field, ii) fragment number field, and iii) sequence number field (420). That is, the receiving entity checks the "more fragments field" of the frame control section 310 (FIG. 3) to determine whether more fragments will follow. In addition, the receiving entity checks the fragment and sequence number fields of the sequence control section 320 (FIG. 3) to determine which fragments of the sequence have been received.

The receiving entity determines whether the fragment just received is the last fragment of the same sequence based on the checking in procedure 420 (430). In procedure 430, if it is determined that the fragment is not the last one, procedures 410–430 are repeated until the last fragment of the sequence is received. If the last fragment of the sequence is received, the receiving entity determines whether all fragments are received (440). Since the fragment number is incremented by one in the same sequence, this procedure 440 can be performed by referring to the fragment and sequence numbers.

Figure 6:
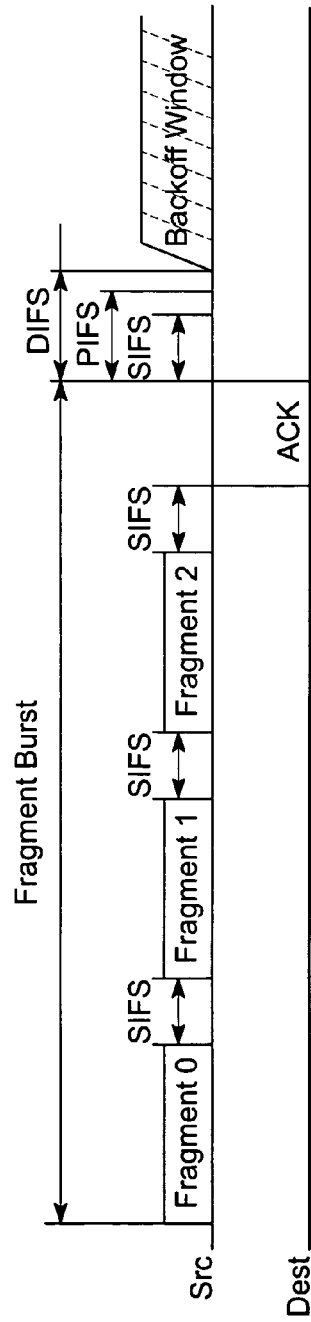
FIG. 6 illustrates frame sequences for explaining an acknowledgment procedure according to one embodiment of the invention.
Figure 7:
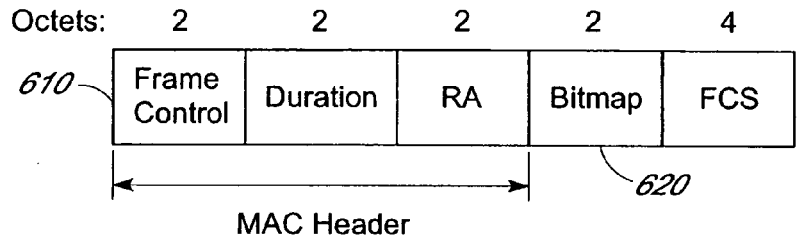
FIG. 7 illustrates an exemplary data format of a modified acknowledgment frame according to one embodiment of the invention.

In procedure 440, if it is determined that all fragments are received, the receiving entity sends a single acknowledgment to the transmitting entity as shown in FIG. 6. In one embodiment, the receiving entity sends a modified ACK frame 600 to the transmitting entity as shown in FIG. 7 (450). The modified ACK frame 600 has been modified from a typical acknowledgment frame, e.g., according to the current IEEE 802.11 standard, which does not include a frame body.

Referring to FIG. 7, the modified ACK frame 600 includes a MAC header (the frame header) and a Bitmap section (the frame body) 620. The Bitmap section 620, having a plurality of Bitmap fields, includes information regarding whether each fragment is correctly received or not in the receiving entity. Based on the Bitmap fields of the Bitmap section 620, the transmitting entity determines whether it needs to retransmit a transmitted fragment. In one embodiment such as in the 802.11 standard, if a Bitmap field of the Bitmap section 620, corresponding to a fifth fragment, is set as "1", this means that the fifth fragment is correctly received. In contrast, if a Bitmap field, corresponding to a third fragment, is set as "0", this means that the third fragment is lost. However, in the current 802.11 standard (see FIG. 2, for example), the receiving entity sends an ACK to the transmitting entity after each fragment is received. This ACK only includes a MAC header and does not include a Bitmap field. In procedure 450, since all of the fragments are received, the Bitmap section of the modified ACK frame 600 is set to indicate that all fragments are correctly received.

Figure 8:
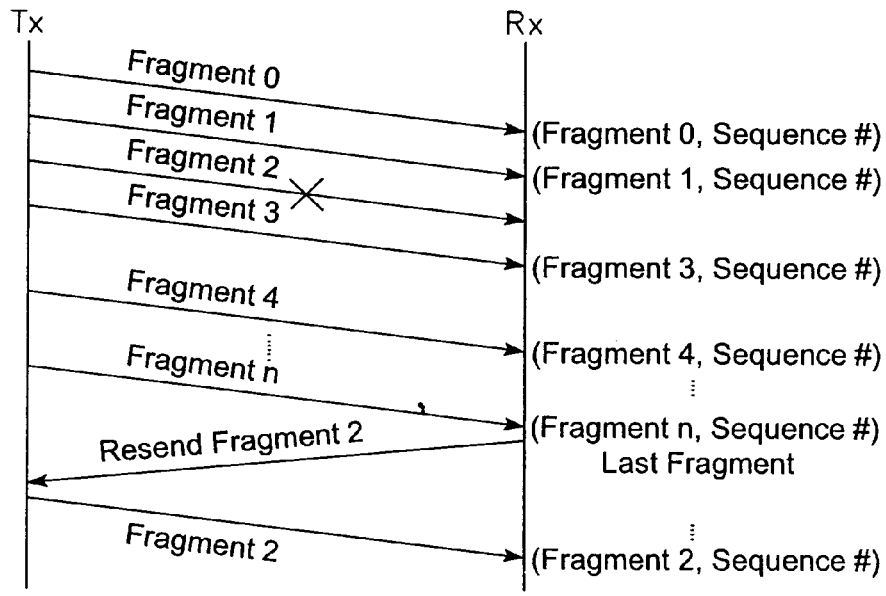
FIG. 8 illustrates frame sequences for explaining an acknowledgment procedure according to another embodiment of the invention.
Figure 9:
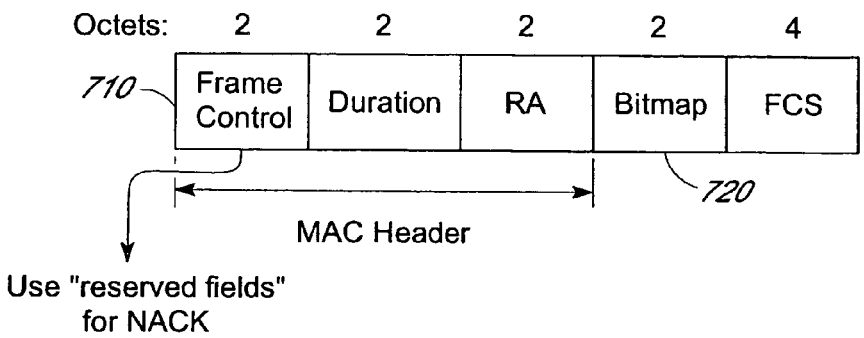
FIG. 9 illustrates an exemplary data format of a No acknowledgment (NACK) frame according to another embodiment of the invention.

In procedure 440, if it is determined that some of the fragments are not received, the receiving entity sends either a modified ACK frame 600 (FIG. 7) or a NACK (No Acknowledgment) frame 700, as shown in FIG. 9 (460). Referring to FIG. 8, fragment "2" among fragments 0–n is lost during the transmission. In this situation, the Bitmap section 620 of the modified ACK frame 600 is set to indicate that fragment 2 is lost and the remaining fragments (fragments 0–1 and 3–n) are correctly received as shown in FIG. 8. The transmitting entity receives the modified ACK frame and decodes the Bitmap field to check the receiving status of the transmitted fragments. The transmitting entity determines that the fragment 2 is lost and retransmits the fragment 2 to the receiving entity.

In the NACK frame 700 (FIG. 9), the Bitmap section 720 is formatted in the same manner as in the modified ACK frame 600. However, a reserved field of the frame control section 710 is used to set the NACK. According to the current IEEE 802.11 standard, the frame control section includes a subtype field, assigned, e.g., 4 bits. There are reserved fields, which are not currently used, among the 4 bits of the subtype field. For example, if "0000" or "0001" values are reserved, these values can be used to define the NACK frame. However, the current IEEE 802.11 standard does not define the NACK frame. One advantage of this NACK frame is that if the transmitting entity receives a NACK frame, it immediately recognizes that at least one fragment was not received or corrupted in the receiving entity without having to check the Bitmap section 720, although thereafter the transmitting entity decodes the bitmap fields to determine the lost fragments.

Figure 10:
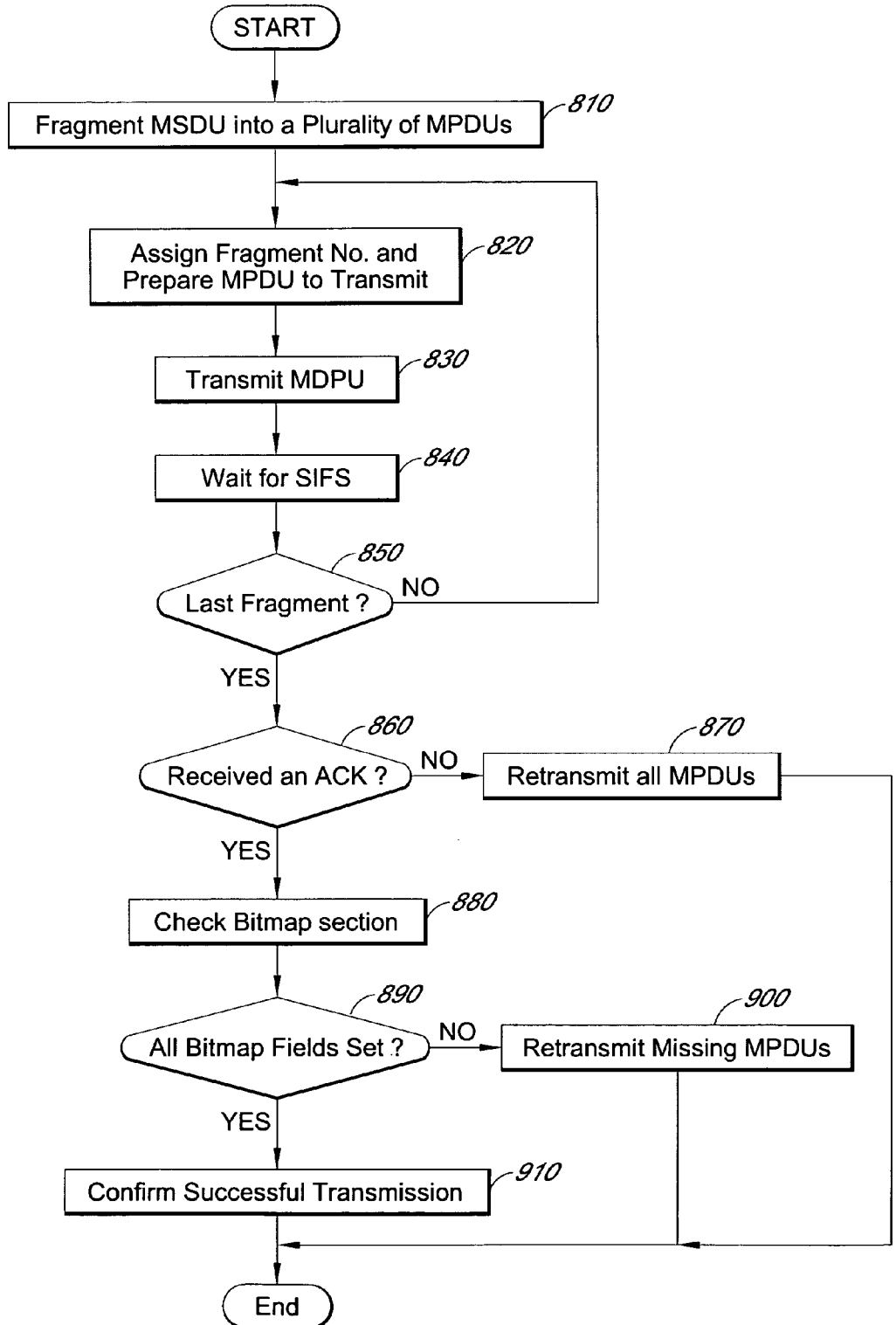
FIG. 10 illustrates an exemplary flowchart which shows an acknowledgment procedure according to another aspect of the invention.

FIG. 10 illustrates an exemplary flowchart which shows an acknowledgment procedure according to another aspect of the invention. This transmitting aspect may be used to operate in a system in conjunction with the receiver aspect presented, for example, in FIG. 5. In one embodiment, the acknowledgment procedure is implemented in a conventional programming language, such as C or C++ or another suitable programming language. In one embodiment of the invention, the program is stored on a computer accessible storage medium at an access point or a transmitting station). In another embodiment, the program can be stored in other system locations so long as it can perform the acknowledgment procedure according to embodiments of the invention.

A transmitting entity (an access point or a transmitting station) fragments a packet (MSDU) into a plurality of fragment packets or fragments (MPDUs) (810). In one embodiment, the procedure of FIG. 10 may be implemented with the IEEE 802.11 standard. For convenience, the procedure of FIG. 10 will be explained based on the IEEE 802.11 standard.

The transmitting entity assigns a fragment number to the first fragment (MPDU) and prepares the MPDU to transmit (820). In one embodiment as shown in FIG. 8, a fragment starts with fragment number "0" and increments by one whereas the sequence number remains the same. The transmitting entity transmits the prepared MPDU (830). The transmitting entity waits for the SIFS period after transmitting the first MPDU (840). As discussed above, SIFS is the period of short inter-frame spaces (SIFS), which are used to separate the packet transmissions.

The transmitting entity determines whether the transmitted MPDU is the last fragment in the same sequence (850). In one embodiment, an MSDU has up to 16 MPDUs. If it is determined that the transmitted MPDU is not the last fragment, procedures 820–850 are repeated until the last fragment of the sequence is transmitted. As seen from FIG. 6, a single acknowledgment is sent from the receiving entity to the transmitting entity after all fragments of the same sequence are received in the receiving entity. Thus, in one embodiment, the transmitting entity transmits the entire fragments of the sequence without waiting for an acknowledgment for each fragment packet from the receiving entity.

In procedure 850, if the last fragment is received, it is determined whether the transmitting entity has received an acknowledgment from the receiving entity (860). If it is determined that an acknowledgment has not been received, the transmitting entity retransmits all MPDUs of the sequence (870). In procedure 860, an acknowledgment has been received from the receiving entity, the transmitting entity checks the Bitmap section 620 of the received acknowledgment frame as shown in FIG. 7 (880). In another embodiment, the transmitting entity receives a NACK frame as shown in FIG. 9. In this embodiment, the transmitting entity determines that some of the transmitted fragments are lost in the receiving entity, without checking the Bitmap section 720, and retransmits the missing fragment(s) to the receiving party based on the Bitmap fields.

The transmitting entity determines whether all Bitmap fields corresponding to each fragment are set or not (890). As discussed above, the Bitmap field shows which fragments are correctly received and which fragments are not correctly received in the receiving entity. For example, if a Bitmap field corresponding to a fragment is set i.e. set to "1", this means that the fragment corresponding to the Bitmap field has been correctly received in the receiving entity. In contrast, if a Bitmap field corresponding to a fragment is not set, this means that the fragment has not been correctly received in the receiving entity. In one embodiment, if the Bitmap field is set as "1" for a fragment, the transmitting entity determines that the fragment is correctly received. On the other hand, if the Bitmap field is set as "0" for a fragment, the transmitting entity determines that the fragment is not correctly received.

In procedure 890, if it is determined that some of the Bitmap fields are not set, the transmitting entity retransmits the missing fragment(s) (900) to the receiving entity. In procedure 890, if it is determined that all of the Bitmap fields are set, the transmitting entity determines that all of the fragmented MPDUs are correctly received in the receiving entity and confirms successful transmission (910).

According to one embodiment of the invention, the overhead related to acknowledgments and SIFS period for each fragment can be significantly reduced. In addition, one embodiment of the invention provides a good link adaptation based on the channel conditions without compromising with the performance. That is, in this embodiment, both the link reliability and the system performance can be enhanced.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of acknowledging the receipt of a transmitted data stream in a wireless local area network (WLAN), the method comprising:
   transmitting a plurality of packets from a transmitting entity to a receiving entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the fragment packets are transmitted in the order of the fragment numbers; determining whether the last fragment packet of the sequence is received in the receiving entity; and
   sending an acknowledgement packet from the receiving entity to the transmitting entity only after it has been determined that the last fragment packet has been received by the receiving entity,
   wherein each of the fragment packets includes a frame control section and a sequence control section, and wherein the determining comprises checking a more fragments field of the frame control section and checking a fragment number field and a sequence number field of the sequence control section so as to determine whether the last fragment packet of the sequence has been received.

2. The method of claim 1, wherein the wireless local area network follows the protocol of one of the IEEE 802.11a/11b/11g standards.

3. A method of acknowledging the receipt of a transmitted data stream in a wireless local area network (WLAN), the method comprising;
   receiving a plurality of packets from a transmitting entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the fragment packets are received in the order of the fragment numbers;
   determining whether the last fragment packet of the sequence is received; and sending an acknowledgement packet to the transmitting entity only after it has been determined that the last fragment packet has been received,
   wherein each of the fragment packets includes a frame control section and a sequence control section, and wherein the determining comprises checking a more fragments field of the frame control section and checking a fragment number field and a sequence number field of the sequence control section so as to determine whether the last fragment packet of the sequence has been received.

4. The method of claim 3, wherein the method is performed in a receiving station.

5. The method of claim 3, further comprising determining whether all fragment packets of the sequence are received.

6. The method of claim 5, wherein if one or more of the fragment packets are not received, the acknowledgement packet includes information indicative of which fragment packets of the sequence are not received.

7. The method of claim 6, wherein the information is defined by a bitmap section of the acknowledgement packet.

8. A method of acknowledging the receipt of a transmitted data stream in a wireless local area network (WLAN), the method comprising:
   receiving a plurality of MAC service data units (MSDUs) from a transmitting entity, each MSDU comprising a plurality of MAC protocol data units (MPDUs), wherein the plurality of MPDUs form a sequence having a sequence number and each of the MPDUs has a fragment number, wherein the fragment numbers are sequentially numbered but the sequence number remains the same, and wherein the MPDUs are received in the order of the fragment numbers;
   determining whether the last MPDU of the sequence is received; and
   sending an acknowledgement frame to the transmitting entity only after it has been determined that the last MPDU has been received,
   wherein each MPDU includes a frame control section and a sequence control section, and wherein the determining comprises checking a more fragments field of the frame control section and checking a fragment number field and a sequence number field of the sequence control section so as to determine whether the last MPDU of the sequence has been received.

9. The method of claim 8, wherein the method is performed in either an access point or a receiving station.

10. The method of claim 8, further comprising:
    determining whether all MPDUs of the sequence are received; and
    sending a NACK frame, which includes information indicative of no acknowledgement, to the transmitting entity, if one or more of the MPDUs are not received.

11. The method of claim 10, wherein the NACK frame includes a frame header having a frame control section and a frame body, and wherein the information is defined by a reserved field of the frame control section.

12. The method of claim 11, wherein the frame body includes a bitmap field indicative of which of the MPDUs have not been received.

13. A method of confirming the receipt of a transmitted data stream in a wireless local area network (WLAN), the method comprising:

sequentially transmitting a plurality of packets to a receiving entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the plurality of fragment packets are transmitted without waiting for an acknowledgement, for each individual fragment packet, from the receiving entity;

receiving an acknowledgement frame from the receiving entity only after the last fragment is transmitted;

checking bitmap fields of a bitmap section of the acknowledgement frame, wherein each of the bitmap fields corresponds to each transmitted fragment packet and indicates whether the corresponding fragment packet has been correctly received or not by the receiving entity;

determining, based on the bitmap fields, whether there is a missing fragment packet, which has not been received by the receiving entity; and retransmitting the missing fragment packet to the receiving entity.

14. The method of claim 13, wherein the method is performed in either an access point or a transmitting station.

15. A system for acknowledging the receipt of a transmitted data stream in a wireless local area network (WLAN), wherein the system is configured to i) receive a plurality of packets from a transmitting entity, each packet being fragmented into a plurality of fragment packets, wherein the plurality of fragment packets form a sequence having a sequence number and each of the plurality of fragment packets has a fragment number, wherein the fragment numbers are sequentially numbered but the sequence number remains the same and wherein the fragment packets are received in the order of the fragment numbers, ii) determine whether the last fragment packet of the sequence is received, and iii) send an acknowledgement packet to the transmitting entity only after it has been determined that the last fragment packet has been received, wherein each of the fragment packets includes a frame control section and a sequence control section, and wherein the system is further configured to check a more fragments field of the frame control section and check a fragment number field and a sequence number field of the sequence control section so as to determine whether the last fragment packet of the sequence has been received.

16. The system of claim 15, wherein the system comprises at least one of an access point and a receiving station.

17. The system of claim 16, wherein the receiving station comprises one of the following: a personal computer (desktop, laptop, palmtop), a mobile phone, or other portable communication devices such as a hand-held PC, a wallet PC and a personal digital assistant (PDA).

18. A system for acknowledging the receipt of a transmitted data stream in a wireless local area network (WLAN), the system comprising:

means for receiving a plurality of packets from a transmitting entity, each packet being fragmented into a plurality or fragment packets, wherein the plurality of fragment packets form a sequence having a sequence number and each of the plurality of fragment packets has a fragment number, wherein the fragment numbers are sequentially numbered but the sequence number remains the same and wherein the fragment packets are received in the order of the fragment numbers;

means for determining whether the last fragment packet of the sequence is received; and means for sending an acknowledgement packet to the transmitting entity only after it has been determined that the last fragment packet has been received, wherein each of the fragment packets includes a frame control section and a sequence control section, and wherein the determining comprises checking a more fragments field of the frame control section and checking a fragment number field and a sequence number field of the sequence control section so as to determine whether the last fragment packet of the sequence has been received.

* * * * *

UNITED STATES PATENT AND TRADEMARK OFFICE
CERTIFICATE OF CORRECTION

PATENT NO. : 7,161,909 B2  Page 1 of 1
APPLICATION NO. : 10/830990
DATED : January 9, 2007
INVENTOR(S) : Sanjeev K. Sharma It is certified that error appears in the above-identified patent and that said Letters Patent is hereby corrected as shown below:

| Column | Line | Correction |
|---|---|---|
| 4 | 12 | Delete "et. al" and insert -- et al. --, therefor. |
| 9 | 67 | In Claim 3, delete "comprising;" and insert -- comprising: --, therefor. |
| 12 | 21 | In Claim 18, delete "reeeiving" and insert -- receiving --, therefor. |
| 12 | 23 | In Claim 18, delete "or" and insert -- of --, therefor. |

Signed and Sealed this

Fifth Day of June, 2007

JON W. DUDAS
*Director of the United States Patent and Trademark Office*